(12) United States Patent
Atkinson

(10) Patent No.: US 6,479,118 B1
(45) Date of Patent: Nov. 12, 2002

(54) FOLDABLE DIE CUT SELF-ADHESIVE LABEL SHEET FOR LABELING CD-ROMS

(75) Inventor: Peter Atkinson, Branford, CT (US)

(73) Assignee: Fellowes Inc., Itasca, IL (US)

( * ) Notice: Subject to any disclaimer, the term of this patent is extended or adjusted under 35 U.S.C. 154(b) by 0 days.

(21) Appl. No.: 09/564,888

(22) Filed: May 4, 2000

(51) Int. Cl.[7] .................................................. G09F 3/00
(52) U.S. Cl. ......................... 428/40.1; 40/340; 40/638; 283/81; 428/42.1; 428/42.2; 428/42.3; 428/43; 428/66.5; 428/66.6
(58) Field of Search ............................... 428/40.1, 42.1, 428/42.2, 42.3, 43, 66.5, 66.6; 40/340, 638; 283/81

(56) References Cited

FOREIGN PATENT DOCUMENTS

DE          29613123        * 11/1996

* cited by examiner

*Primary Examiner*—Nasser Ahmad
(74) *Attorney, Agent, or Firm*—Brinks Hofer Gilson & Lione

(57) ABSTRACT

According to the present invention, six die-cut CD-ROM labels are provided on a sheet in a vertical pattern with labels offset from a scored or perforated centerline of the other three. Each set of three is spaced from the outer edges of the sheet and by folding the sheet in half and removing a corner tab an adhesive edge of one of the labels is exposed which can be applied to a disk manually held on a printed outline of the disk on the back of the sheet, obviating the need for use of any applicator centering device, or holder for the disk, and/or label.

7 Claims, 4 Drawing Sheets

FOLDABLE DIE CUT SELF-ADHESIVE LABEL SHEET FOR LABELING CD-ROMS

FIELD OF THE INVENTION

The present invention relates to the field of self-adhesive labels for CD-ROMS, and more particularly, the invention relates to a die cut sheet having a plurality of labels formed thereon and the method of applying the labels from the sheet to a CD-ROM.

BACKGROUND OF THE INVENTION

The proliferation of compact disks (discs), also known as laser disks, in the form of music as well as CD-ROM products has become extensive. In recent years, recordable compact disks have grown in popularity. Further, these disks are being used for archival data storage, immediate distribution of data, and for demonstration purposes.

With this recent use has grown a need to label these disks once they have been produced. This is because once produced; there is no apparent visual method for determining the contents of a disk, which may contain 680 MB of data or more. While manufacturers of large numbers of identical disks have their labels or identifying information painted, silk-screened or printed onto the disks, e.g., a layer of adherent ink or pigment is applied to the surface of the disk, this method is impractical for recordable compact disk producers. For small runs or those requiring immediate availability of the disk, printing or painting based methods of labeling take too much time, incur a significant setup charge, and require special equipment.

Another known method of labeling a compact disk employs a direct printing using an ink jet system onto the surface of a disk. These systems provide a special carrier for the disk, which is printed using a conventional ink jet printing apparatus. This method suffers the shortcomings of ink jet technology, including problems with the label used, such as smudging, running, lack of scratch resistance on the disk surface, and the like.

Ink markers may also be used to label disks, but this is unattractive and can cause damage to the disk by breaking down the coating, which protects the disk. Permanent ink markers often include solvents in the ink.

As a result, manufacturers such as the assignee of the present invention have begun producing self-adhesive labels shaped like and designed for compact disks. Typically, labels were printed one at a time through a printer, with a later design allowing "two up" printing of two compact disk labels aligned and centered on a single sheet. The labels are provided on computer printable sheets that are die cut so that after printing with indicia, the labels can be removed and adhered to the disk. An example of such a sheet capable of supporting three (3) labels or a "three up" is shown in U.S. Pat. No. 5,770,289.

The assignee of the present invention has also developed a compact disk labeling device known as the "NEATO," which easily centers a self-adhesive label with respect to a compact disk or recordable compact disk before allowing contact therewith. The labeling device and method are disclosed in U.S. Pat. Nos. 5,543,001 and 5,902,446. For smaller, oval-shaped discs used primarily for business data the assignee has developed a smaller disc holder for use in manually applying the label to the disc, disclosed in U.S. Ser. No. 09/474,684 filed Dec. 29, 1999. Thus, the prior art methods of marking the disks with felt tip markers, manually positioning rectangular or circular labels on the disk, and printing directly on the disks with an ink jet printer are obviated.

SUMMARY OF THE INVENTION

According to the present invention, six die-cut CD-ROM labels are provided on a sheet in a vertical pattern with labels offset from a scored or perforated centerline of the other three. Each set of three is spaced from the outer edges of the sheet and by folding the sheet in half and removing a corner tab an adhesive edge portion of one of the labels is exposed which can be applied to a disk manually held on a printed outline of the disk on the back of the backing sheet, obviating the need for use of any applicator centering device, or holder for the disk, and/or label.

The adhesive labels are provided as die cut blanks and having a backing sheet. Each label is removable by tearing a tab along micro-perforations and a die cut in the backing sheet, to expose a portion of the adhesive on the adhesive edge or "sticky" side of the label. A CD-ROM disk may then be placed on the printed outline on the back of the die cut sheet, also provided with die cut therein to assist in removal of the label from the sheet and the sheet folded about the foldable centerline to adhere the exposed adhesive edge portion of the label to the edge surface of the aligned disk. The die cut label may then be peeled from the backing sheet and smoothed down on the remaining portion of the disk.

This process is repeated for each label on each side of the centerline until the labels are depleted. Therefore, not only are labels provided which after printing graphics from a computer-generated template, which can be removed and adhered to a compact disk for identification, but the label sheet completely does away with the necessity of providing a labeler device or disk holder while applying the label.

Typical sheets and label dimensions are illustrated in the accompanying drawings.

The label sheet may be formed of a stock having an aluminum layer or a pigmented layer over at least the die cut portions. A preferred weight of the stock is about 80 pound.

These and other objects and features of the present invention will become more fully apparent from the following description and appended claims taken in conjunction with the accompanying drawings, in which like numerals refer to like parts.

DETAILED DESCRIPTION OF THE PREFERRED EMBODIMENT

Figure 1:
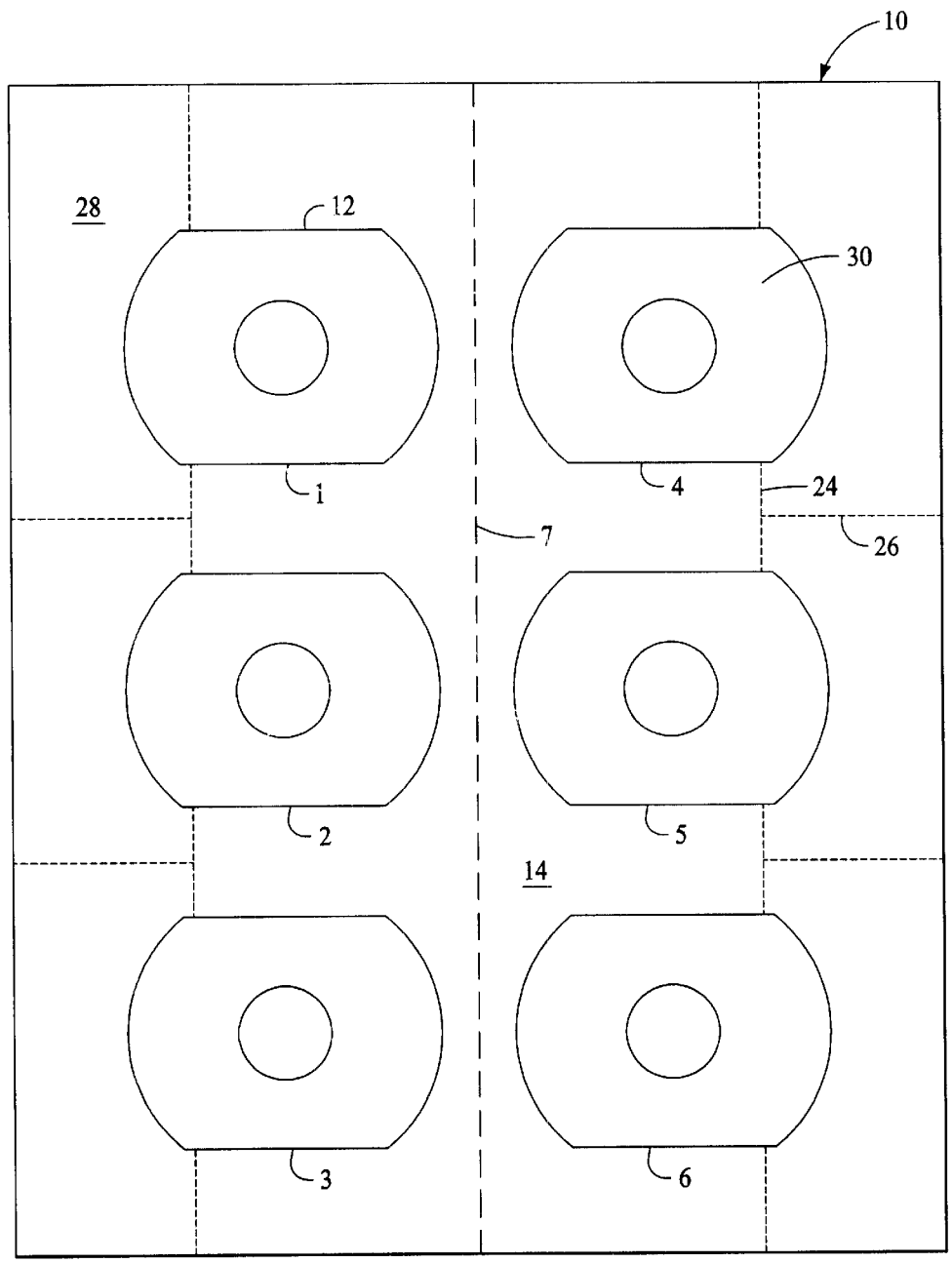
FIG. 1 shows a layout of the face of a die cut letter size sheet having six peelable labels, including preferred dimensions, according to the present invention.

The invention will now be described by way of the drawing in which corresponding reference numerals indicate corresponding structures in the Figures.

Figure 2:
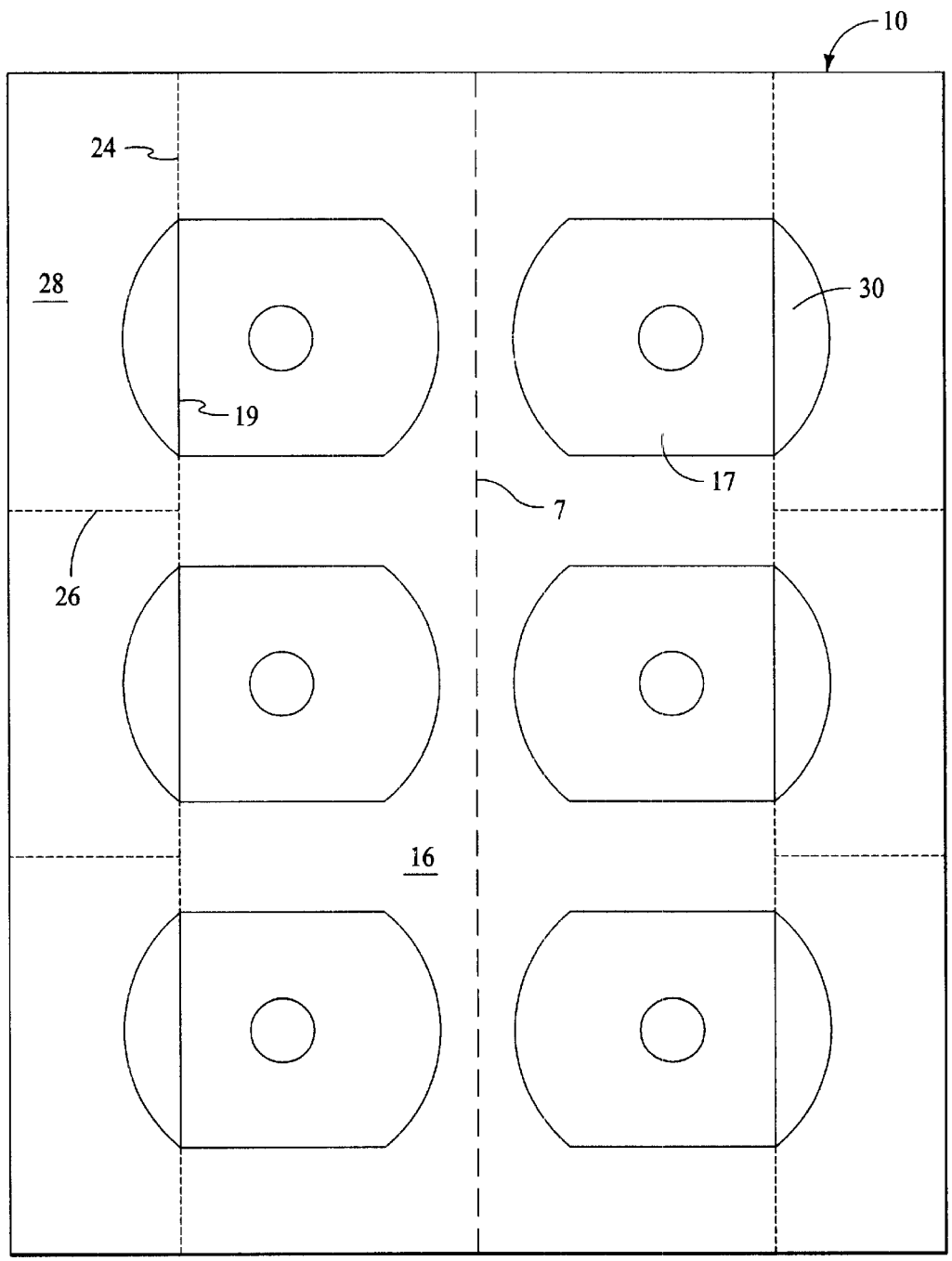
FIG. 2 shows a layout of the back of the sheet of FIG. 1 complete with die-cuts and printed disk outlines.

FIG. 1 and FIG. 2 show the face 14 and back 16 respectively of a sheet 10 having a preferred layout of the die cut CD-ROM labels 1, 2, 3, 4, 5 and 6 according to the present invention. Three CD-ROM labels, 1, 2, 3 are laid out on one side of foldable, perforated centerline 7 of the face 14 of sheet 10, while labels 4, 5 and 6 are on the opposite side. The labels are defined by die-cut lines 12 in the sheet stock which have arcuate and straight portions conforming to the shape of the disk to which they are applied. Alternatively, the labels can be completely circular in shape. The back 16 of sheet 10 is provided with printed outlines 17 for each disk at the same location, as indicated by the dimensions (in mm) as the die cut labels on the front face 14. Each die-cut and printed outline 17 conforms to the shape of a disk to receive a label 1–6, at the exact location of a label on the face 14. Die cuts 19 are also provided on back 16 to aid in removal of each label tab 1–6 from the sheet stock. The die cuts 19, however, do not include the arcuate edge portions. The vertical backing cut 19 is contiguous with micro-perforated tear lines 24, having a juncture with horizontal micro-perforated tear lines 26 extending inwardly from each edge of the sheet to define a tab 28 adjacent to one arcuate edge of each label 1–6.

Figure 3:
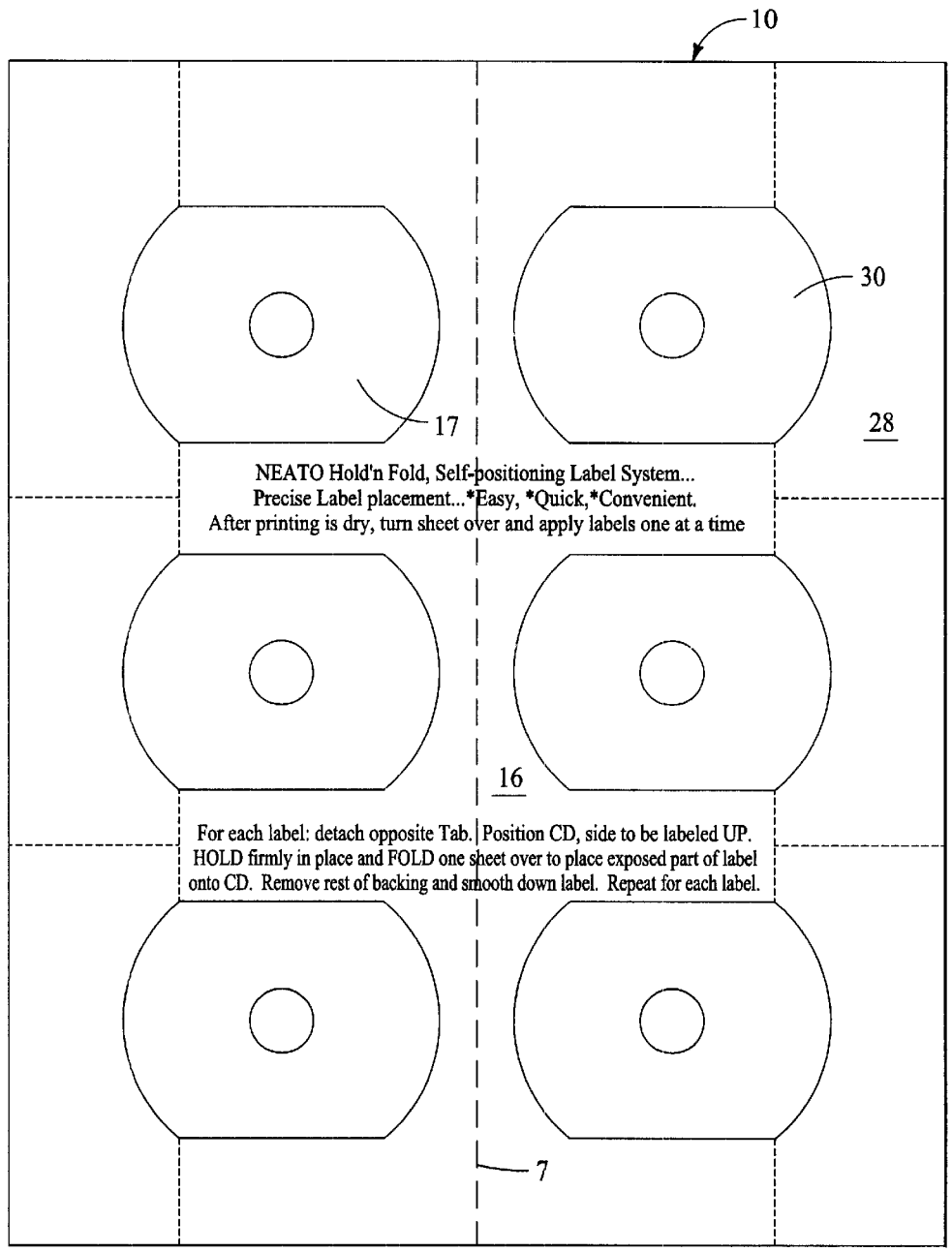
FIG. 3 is an enlarged portion of the sheet of FIG. 1 illustrating sample indicia and instructions for use of the labeling system and sheet which can be printed on the face of the sheet.
Figure 4:
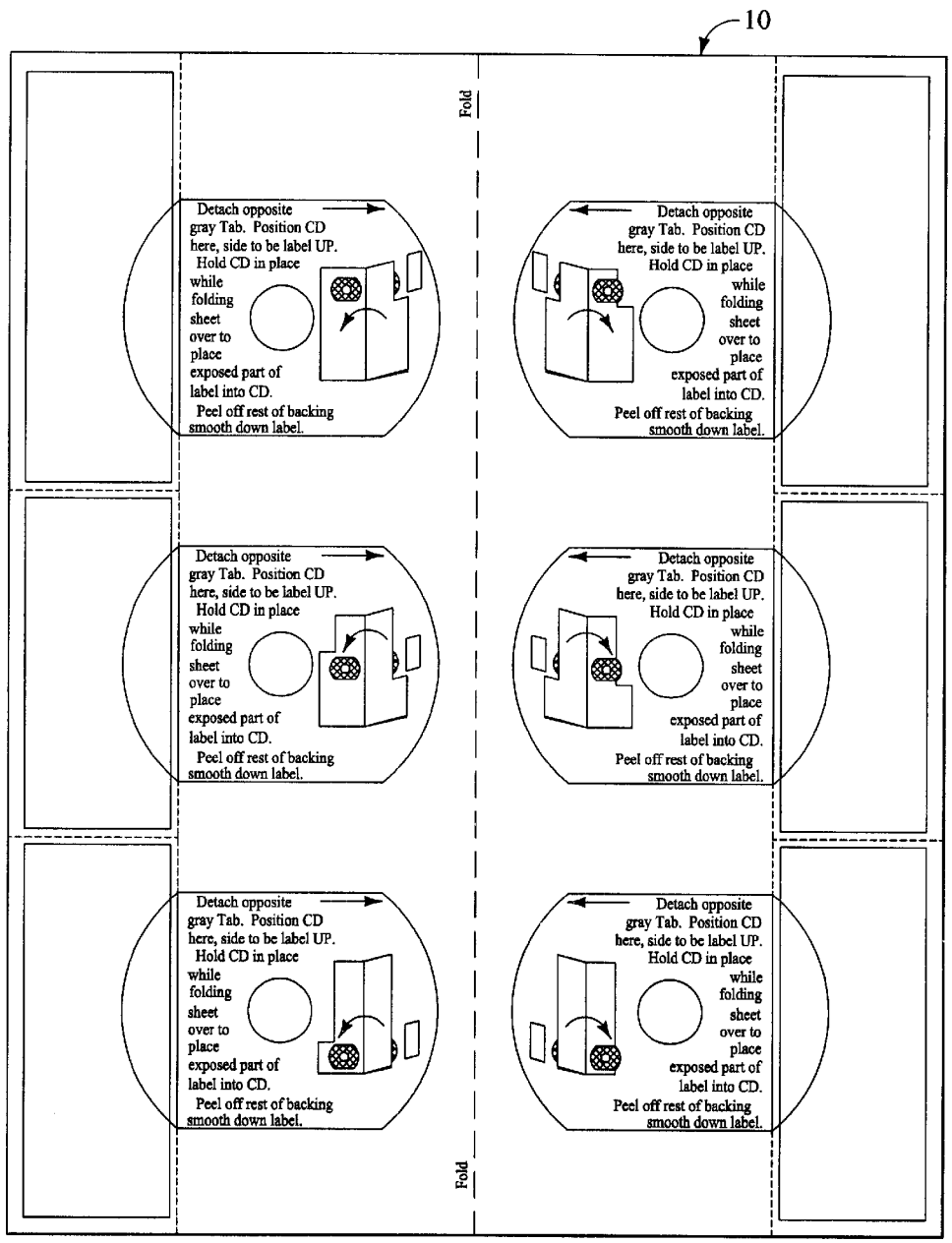
FIG. 4 is a schematic representation of how to use the sheet in the application of a label to a CD-ROM disk

FIG. 3 illustrates instructions for use of the sheet, while FIG. 4 illustrates schematically, the steps to follow to apply each label to a disk. Succinctly, after printing the label, turn sheet 10 over to back 16 and for each label; detach the opposite tab 28. Position the CD-ROM disk, side to be labeled, up, on the opposed printed disk outline 17. Hold the disk firmly in place on the outline and fold the sheet 10 over about centerline 7 to place exposed portion 30 of the label containing an adhesive backing onto the disk. The rest of backing is then removed from the sheet by peeling the label along die cut 12 and smoothing down the label. This is illustrated schematically in FIG. 4.

The label sheet 10 may be formed of white stock, preferably heavy enough to prevent show-through of any markings on the CD-ROM, or colored stock, which may be colored entirely or to a position just outside the die cut margins. The label stock 10 may also be an aluminized foil stock. Preferably, the stock is 80 pound or greater.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. Consequently, the full scope of the invention should be ascertained by the appended claims.

What is claimed is:

1. A printable die cut self adhesive CD-ROM label sheet comprising at least one die-cut label on a face of said sheet arranged on one side of a foldable centerline on the face of said sheet and a printed outline on said sheet conforming in shape and location to said label provided on an opposite face of said sheet on the other side of said centerline, and a removable tab adjacent an edge of said label to expose the die cut edge of said label when the tab is removed, whereby the exposed edge may be adhered to a disk positioned on said outline when the sheet is folded about said centerline.

2. The label sheet of claim 1 wherein said centerline is a perforated vertical line formed on said sheet.

3. The label sheet of claim 1 wherein said removable tab is formed by vertical and horizontal micro-perforations through said sheet having a junction with portions of said die cut label on the face and opposite face of said sheet.

4. The label sheet of claim 1 wherein said centerline is a vertical line formed on said sheet.

5. The label sheet of claim 1 wherein said removable tab is formed by vertical and horizontal tear lines formed in and through said sheet having a junction with portion of said die cut label on the face and opposite face of said sheet.

6. A method for applying a die cut self-adhesive CD-ROM label to a CD-ROM disk comprising the steps of providing a label sheet having a die cut label with an adhesive backing formed thereon on the face of said sheet and an outline of at least a portion of said disk on an opposite back side of said sheet, positioning the disk on the outline, tearing a portion of said sheet to expose an adhesive edge of said label, and folding said sheet over about its center to adhere sad label edge to the positioned disk, peeling the label from the sheet and smoothing it onto the disk.

7. The method of claim 6 wherein said center of said sheet is defined by a vertical line on said sheet.

\* \* \* \* \*

UNITED STATES PATENT AND TRADEMARK OFFICE
CERTIFICATE OF CORRECTION

PATENT NO. : 6,479,118 B1
DATED : November 12, 2002
INVENTOR(S) : Peter Atkinson It is certified that error appears in the above-identified patent and that said Letters Patent is hereby corrected as shown below:

<u>Column 4,</u>
Line 37, after "adhere" delete "sad" and substitute -- said -- its place.

Signed and Sealed this

Thirteenth Day of January, 2004

JON W. DUDAS
*Acting Director of the United States Patent and Trademark Office*